(12) United States Patent
Wigmore et al.

(10) Patent No.: US 9,772,910 B1
(45) Date of Patent: Sep. 26, 2017

(54) RESOURCE OPTIMIZATION FOR STORAGE INTEGRATED DATA PROTECTION

(71) Applicant: EMC Corporation, Hopkinton, MA (US)

(72) Inventors: Ian Wigmore, Westborough, MA (US); Arieh Don, Newton, MA (US); Stephen Smaldone, Woodstock, CT (US)

(73) Assignee: EMC IP Holding Co. LLC, Hopkinton, MA (US)

( * ) Notice: Subject to any disclaimer, the term of this patent is extended or adjusted under 35 U.S.C. 154(b) by 92 days.

(21) Appl. No.: 14/961,763

(22) Filed: Dec. 7, 2015

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 11/1458* (2013.01); *G06F 11/1464* (2013.01); *G06F 2201/84* (2013.01)

(58) Field of Classification Search
CPC ............ G06F 11/1448; G06F 11/1451; G06F 11/1453; G06F 11/1458; G06F 11/1464; G06F 11/1469; G06F 2201/84; G06F 12/02
See application file for complete search history.

(56) References Cited

U.S. PATENT DOCUMENTS

| | | | | |
|---|---|---|---|---|
| 8,725,981 | B2* | 5/2014 | Eguchi | G06F 11/1466 711/162 |
| 9,037,905 | B2* | 5/2015 | Sakurai | G06F 11/1412 714/15 |
| 2003/0177306 | A1* | 9/2003 | Cochran | G06F 11/2082 711/114 |
| 2015/0106580 | A1* | 4/2015 | Abercrombie | G06F 11/1461 711/162 |
| 2015/0142745 | A1* | 5/2015 | Tekade | G06F 11/1451 707/646 |
| 2015/0378836 | A1* | 12/2015 | Beeken | G06F 11/1448 707/639 |
| 2016/0292043 | A1* | 10/2016 | Dennis | G06F 11/1451 |

* cited by examiner

*Primary Examiner* — Marc Duncan
(74) *Attorney, Agent, or Firm* — Barry N. Young

(57) ABSTRACT

Resources are optimized in an integrated data protection system having a production host, primary storage and a backup appliance for backup and restore of lost data to a selected restore point. Data tracks in primary storage having changed data are pushed to backup storage with a changed-tracks bitmap mapping the changed tracks. A selected restore capacity is reserved on a restore device, but the restore device is only provisioned for a capacity sufficient to store changed tracks corresponding to the selected restore point, thus obviating the creation and storing of metadata for the unprovisioned capacity. This conserves significant storage and memory capacity and reduces processing requirements.

20 Claims, 2 Drawing Sheets

RESOURCE OPTIMIZATION FOR STORAGE INTEGRATED DATA PROTECTION

BACKGROUND

This invention relates generally to backup and restore operations, and more particularly to optimization of storage resources in integrated data protection systems.

Data protection systems that protect data long term from loss due to corruption or damage with backup and recovery/restore approaches, particularly those used for enterprises and large data systems, need to conserve storage capacity and optimize resources. To accommodate the unrelenting increase in data and to meet the availability and data protection requirements of enterprises and other organizations, datacenters must provide sufficient primary and backup storage capacity to handle these needs. Typically, this means providing the same amount of backup storage capacity as the primary storage capacity, which results in reserving excess storage capacity. However, excess storage capacity is costly to provide and to maintain, adds significant overhead and inefficiencies, impacts application servers, processes and networks, and slows backup, restore and other system processes.

While there are data protection systems that integrate primary and backup storage and that de-duplicate and compress backup data, which reduce the need for storage capacity and address many of these inefficiencies, there is still a need to minimize excess storage capacity and to optimize storage resources. Most known systems require configuring restore devices of the same capacity and count as backed-up application devices in order to avoid having a situation where there are no available resources to which to restore lost or corrupted data. Although restore devices may be thinly provisioned, they nevertheless consume a large amount of metadata which requires scarce memory storage capacity and has a direct impact on a user.

It is desirable to provide resource optimized storage and data protection systems and methods that address the foregoing and other known problems of storage and data protection systems, and it is to these ends that the present invention is directed.

DESCRIPTION OF PREFERRED EMBODIMENTS

This invention is particularly well adapted for use with a storage integrated data protection system comprising a primary storage system integrated with a backup appliance that de-duplicates and compresses backup data, and will be described in that context. As will become apparent, however, this is illustrative of only one utility of the invention, and that the invention has wider applicability and may be used with other types of storage and backup systems.

Figure 1:
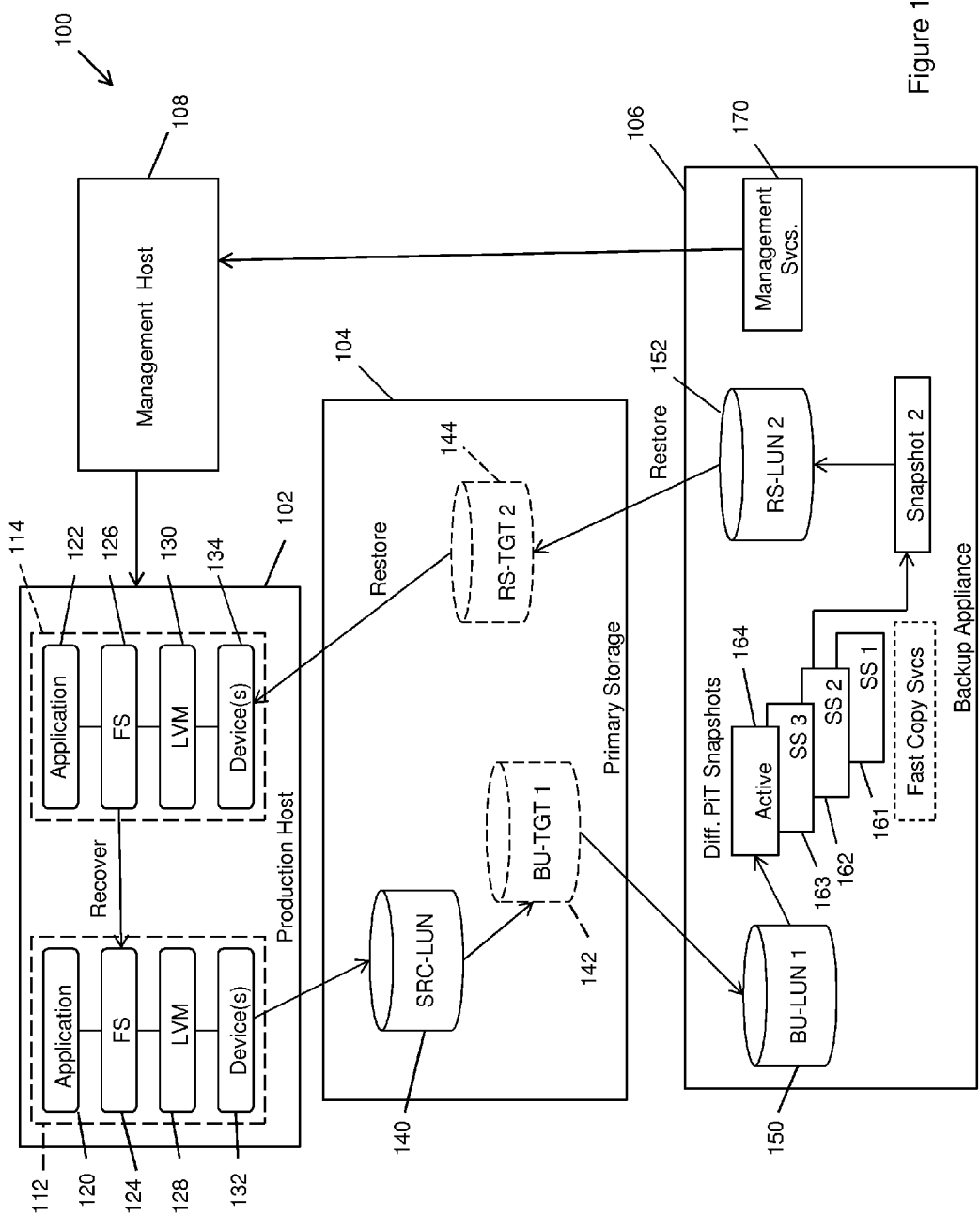
FIG. 1 is a functional block diagram of a storage integrated data protection system in accordance with an embodiment of the invention.

FIG. 1 illustrates functionally an embodiment of a storage integrated data protection system 100 in accordance with the invention for the storage, backup and recovery of production data. System 100 may be in a datacenter, for instance, of an enterprise or other organization. It is formed to protect data long term against corruption, damage or loss. As will be described, the system is particularly advantageous for use in an enterprise where the data environment is one in which storage capacity requirements are continuously growing and in which applications increasingly need to be online and operational 24×7×365.

As shown in the figure, system 100 may have subsystems comprising a production host 102, primary storage 104, a backup appliance 106 and a management host 108, optimized and integrated for storage data protection and management. The production host subsystem 102 may be a computer system that runs separate instances 112, 114 of applications 120, 122, file systems 124, 126, logical volume managers 128, 130 and logical storage devices 132 and 134. The applications, file systems, logical volume managers and logical devices of instances 112 and 114 may be similar. The production host subsystem 102 may be used for transaction processing, for example, with application 120 being a transaction processing application that produces production data for file system 124, and logical volume manager 128 manages the storage of the production data on one or more of the logical storage devices 132. There may be a plurality of logical storage devices, each with predetermined storage capacity of 100 TB, for example. Instance 112 may produce the production data. The application, file system, logical volume manager and devices of instance 114 may mirror corresponding elements of instance 112 and, as will be described, may be used to restore and recover lost or corrupted data to primary storage.

The primary storage 104 comprises the physical primary storage for system 100, and the backup appliance 106 comprises the physical backup storage for the system 100. The primary storage 104 may be a storage array comprising one or more storage devices (SRC-LUN) 140 to which the production host stores production data, and may comprise logical target devices 142 (BU-TGT 1) and 144 (RS-TGT 2) for backup and restore, respectively. The physical storage devices corresponding to logical backup and restore devices 142 and 144 are devices 150 (BU-LUN 1) and 152 (RS-LUN 2), respectively, of the backup appliance 106. The production data stored on SRC-LUN 140 becomes the source of the backup data that is written to the logical target device 142 of the primary storage and ultimately to the corresponding physical device 150 (BU-LUN 1) of the backup appliance 106 as backup (protection) data, as will be described. Likewise, logical target device 144 (RS-TGT 2) of the primary storage 104 becomes the target device for restore data written from physical restore device 152 (RS-LUN 2) of the backup appliance 106, and is the source of the restore data ultimately sent to device 134 of the production host 102. Normally, only logical target BU-TGT 1, 142 and its corresponding physical target BU-LUN 1, 150, are operating to store backup data. Logical target RS-TGT 2, 144 and corresponding physical device RS-LUN 2, 152 are not needed until a restore is necessary.

Backup appliance 106 may comprise physical storage devices 150 (BU-LUN 1) and 152 (RS-LUN 2) for backup and restore, respectively. In an embodiment, the backup appliance may be a Data Domain DDR backup system (of EMC Corporation, the assignee of the present invention) that de-duplicates and compresses incoming backup data in-line. In another embodiment, the backup appliance may comprise a virtual machine that runs on the primary storage subsystem 104. Initially, a complete backup of the source data of SRC-LUN, 140, may be preformed and the backup data stored on BU-LUN 1, 150, of the backup appliance. The production data produced by the production host for each separate device 132 may be stored in primary storage 104 on SRC-LUN 140 arranged in tracks of a predetermined size, e.g., 128 KB (kilobytes) per track. As the production host continues to produce production data, it may also generate and maintain a continuously updated changed-tracks bitmap on the SRC-LUN indicating the tracks that have data changes (dirty tracks). Periodically, e.g., every hour, the primary storage system may push (copy directly) the track data of the dirty tracks to the logical device BU-TGT 1, 142 and to the physical device BU-LUN 1, 150 of the backup appliance as backup data, and write the changed-tracks bitmap to the devices. The changed-tracks bitmap may also be written directly to the devices, as by using an executable command, such as a SCSI write command, for instance. Subsequent to the backup appliance storing a backup copy of the production data, the data of tracks that are unchanged do not need to be pushed to the backup appliance. Only changed tracks need to be pushed to backup storage. As the backup appliance receives the data of the changed tracks, it preferably de-duplicates, compresses and updates the previously stored backup data on BU-LUN 1, 150, corresponding to the track data that was changed. It does not update or store another copy of the unchanged data of a track. Accordingly, this substantially reduces backup processing and the otherwise required storage capacity for backup data.

In a preferred embodiment, the primary storage subsystem 104 is an EMC Corporation VMAX$^3$ storage array that has a storage integrated data protection software agent that integrates primary storage with the backup (protection) storage of the backup appliance, and allows fast, efficient copying (pushing) of primary source data directly to protection storage.

The backup appliance 106 may periodically at preselected times, e.g., hourly, create and store on the backup storage device, BU-LUN 1,150, differential point-in-time ("PiT") snapshots of the backup data to form a plurality of restore points. FIG. 1 shows four such snapshots 161 (SS 1), 162 (SS 2), 163 (SS 3) and 164, although, as may be appreciated, there may be many others. In the event the primary storage crashes or otherwise loses data, the restore points enable the SRC-LUN primary storage to be restored back to a desired restore point. The protection storage BU-LUN 1 may copy the appropriate snapshot corresponding to a desired restore point to the physical restore device RS-LUN-2 and to the logical restore target RS-TGT 2, 144. FIG. 1 illustrates an example Snapshot 2 being copied to RS-LUN 2. This is preferably done using a fast copy service process, as indicated. Snapshot 2 may be a restore point for a time prior to a data loss or to a crash of the primary storage which is to be restored.

Application 122 of the production host 102 may access the restore point data from logical device RS-TGT 2, 144, and write it to device 134. Then, file system 126 may copy the missing or corrupted files to file system 124, and application 120 may restore the files to the SRC-LUN 140 to recover them to primary storage.

Typically, physical storage device SRC-LUN 140 may be sized to accommodate the required storage capacity of all devices 132 of the production host. If, for example, there are 10 devices 132 each having a capacity of 100 TB, physical storage device 140 may have a capacity size of 1000 TB. Also, each of the 10 logical devices 132 could correspond to 10 different 100 TB SRC-LUNs similar to 140 on primary storage 104. Preferably, it will be provisioned with thin devices (TDev) corresponding to devices 132. The storage subsystem 104 will write changed data tracks from storage device SRC-LUN 140 to the logical target BU-TGT 1, 142, and push the data to BU-LUN 1, 150, of the backup appliance with the changed-track bitmap, as previously described. Normally, the backup appliance physical device BU-LUN 1, 150 may have the same size as primary storage device SRC-LUN 140.

In known backup and recovery systems, the physical restore storage device (corresponding to RS-LUN 2) of a backup and recovery system to which restore data is written for recovery must be provisioned to be full-sized, i.e., to have the same capacity and have the same number (count) of LUNs as the physical backup storage device (corresponding to BU-LUN 1) even though only a small part of the protected backup data may need to be restored. The production host that is writing and reading data expects to see a restore device that is the same size as the backup device. This means that conventionally if the backup storage device is provisioned to be 1000 TB, the restore device must also be provisioned to be 1000 TB, and all 1000 TB capacity must be provided even if only a small portion of this total capacity is actually used, and corresponding metadata must be created and stored in memory. Providing unnecessary storage and memory space is expensive and inefficient. If the total size of the backed up protected data is only 50 TB, the provisioned size of the restore device need safely be no more than the backed up capacity plus any desired additional amount to afford a small safety margin, as a total of about 60 TB, for instance. Providing any excess amount unnecessarily wastes storage capacity and resources. Furthermore, internal metadata used for management of backup and restore resources must be created and stored in memory upon provisioning the physical storage device. This internal metadata provides track-specific information to the system, such as which tracks are written and their locations, the latest track written, when it was written, etc. This internal metadata can be substantial and can require significant additional memory capacity on primary storage array 104 and backup storage appliance 106. In known systems, this metadata must be created and maintained upon provisioning a storage device, even for storage space which stores no data. This requires that the system have additional capacity beyond its actual storage needs, which is burdensome and costly to provide and to maintain.

The invention avoids these problems, as will be described, by not provisioning the restore device to be full-sized, which obviates the associated metadata. Rather, the invention determines the maximum capacity required for data backed up to the backup appliance (in a manner to be described), and provisions a restore device to have no more than that maximum capacity plus any desired additional small capacity as a safety margin, and provisions sufficient memory capacity to store the associated metadata. Thus, metadata must be created, stored and maintained only for the maximum capacity provisioned on the restore device, rather than for the full size of the device, which substantially reduces the required storage capacity needed and the resources necessary to maintain it.

In order to determine the maximum capacity required for provisioning the restore devices, the invention may determine this capacity simply by determining a count of the number of changed tracks that have been backed up to protected storage. The maximum capacity required may then be determined as the count of the number of changed tracks times the amount of data of each track (128 KB, for example). Since all tracks are the same size, it is not necessary to know which particular tracks which were changed and backed up, and it is not necessary to store this type of metadata. Rather, it is only necessary to know the total number of tracks that were changed to determine the maximum restore capacity required. This further reduces the required data storage capacity and processing necessary for a restore operation.

Figure 2:
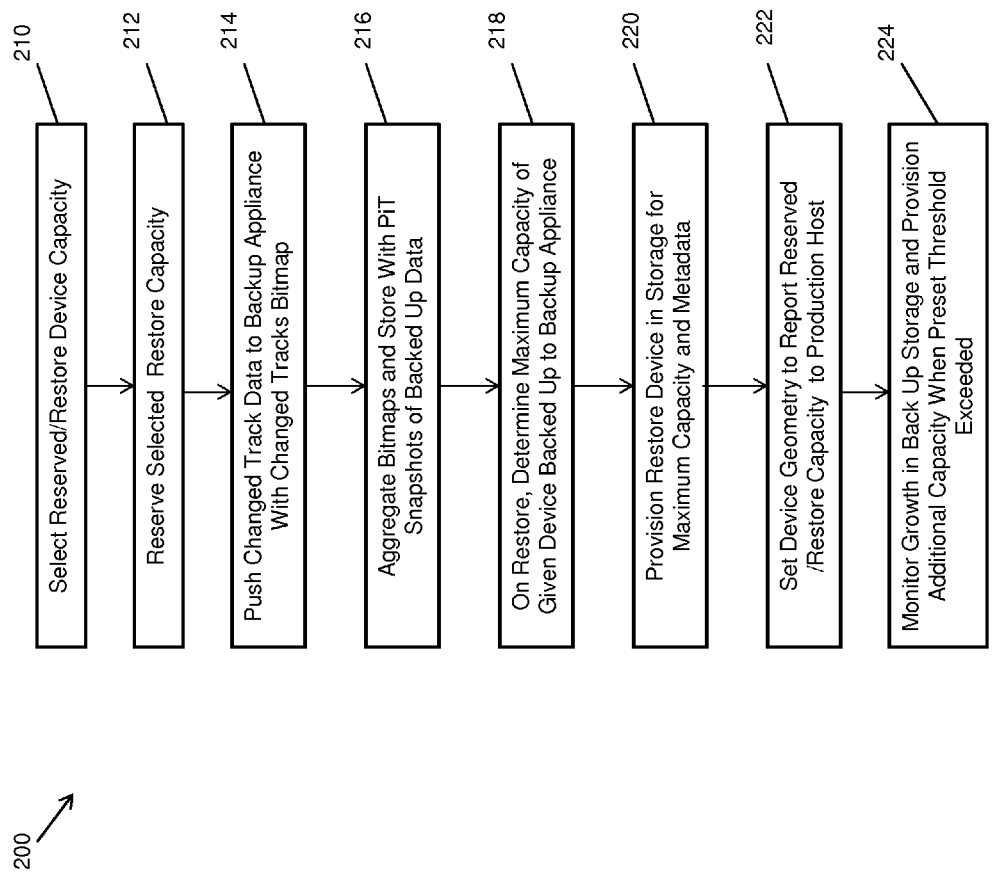
FIG. 2 is a diagram of a preferred embodiment of a backup and recovery workflow process in accordance with the invention, as may be performed by the system of FIG. 1.

FIG. 2 is a diagrammatic view that illustrates a backup and recovery/restore workflow process 200 in accordance with an embodiment of the invention. The process of FIG. 2 provides a more detailed description of a preferred embodiment of the backup and restore operations performed by the system 100 illustrated in FIG. 1.

At step 210, knowing the backed up TDev capacity of the physical storage device 150 of the backup appliance, a reserved/restore capacity may be selected for the restore physical storage device RS-LUN 2, 152 and for the logical restore device RS-TGT 2, 144. If, for example, there are 10 devices in the system, each provisioned for 100 TB, which equates to a total full backup capacity of 1000 TB, but no more than 5 TB has been written to any device, the maximum restore capacity that is needed would be 50 TB if all 10 devices had 5 TB written, and this is the capacity that need be reserved. At step 212 the selected reserved/restore capacity of thin devices (TDevs) may be reserved for RS-LUN 2, 152, and for RS-TGT 2, 144. At this time, the selected reserved/restore TDev capacity need not be provisioned in the devices, but only reserved. Therefore, there is no need to create and store the associated metadata until the capacity is actually provisioned.

During operation of the system 100, the production host 102 will write production data to the SRC-LUN physical storage device 140. At step 214, the primary storage subsystem 104 will identify the tracks that have changed the data, create a changed tracks bitmap, and push the changed track data and the changed tracks bitmap to the logical backup target device BU-TGT 1, 142, and to the physical storage device BU-LUN 1, 150, of the backup appliance, which will write the changed track data as backup data. The primary storage may additionally push the changed tracks bitmap to the backup appliance using a predefined SCSI write command. As described above, the changed tracks bitmap provides a mapping of the dirty tracks in primary storage to the backup appliance. The changed tracks bitmap is preferably sent on a per device basis for each device 132 of the production host that has changed track data.

At 216, the backup appliance may periodically aggregate the bitmaps and store the aggregated bitmaps with corresponding fast copy differential point-in-time (PiT) snapshots of the backed up data. As noted above, initially a full backup of the production data in the primary storage subsystem may be stored on the backup appliance 106. Thereafter, at predetermined times the backed up data of each track that has changed since a previous backup may be updated with the changed track data, and a differential PiT snapshot may be created and stored as a restore point, as previously described.

At step 218, upon a restore operation for a given device being started to restore lost or corrupted data to a particular restore point, the system will select the appropriate snapshot and determine the maximum capacity of the of the track data of a given device that was changed and actually backed up to the backup appliance. Preferably, it does this using the aggregated bitmaps to determine the highest number of changed tracks that were actually backed up, and by multiplying the track size, e.g., 128 KB, by this number of changed tracks. At 220, the backup appliance may notify the primary storage subsystem 104 to provision restore TDevs with a size corresponding to the determined maximum capacity that was backed up, and the primary storage system will provision the logical restore device RS-TGT 2, 144, and physical restore device RS-LUN 2, 152 accordingly, i.e., for the amount of data being restored. The storage subsystem 104 in response to the notification from the backup appliance may provision the restore devices for the notified maximum capacity on a per device basis. Provisioning restore devices on demand, rather than upfront, is more efficient and cost-effective.

At 222, the primary storage subsystem 104 sets the device geometry of the provisioned restore devices so that they report to the production host subsystem 102 that they were provisioned to the originally selected reserved/restore device capacity. For instance, if the restore devices 152 and 144 were provisioned for 5 TB for a given device, but the original selected reserved/restore capacity was 100 TB, the restore device geometry is set such that upon being queried by the production host as to their provisioned capacity the restore devices would report their reserved/restore capacity of 100 TB instead of their actually provisioned (and needed) capacity of 5 TB. The benefit of such on demand provisioning is that it minimizes unneeded TDEVs, avoids the burden and expense of creating, storing and maintaining unnecessary metadata, and results in better utilization of the restore capacity. Normally, as described above, metadata must be created and stored for the full provisioned capacity of a device, even if only part of that capacity is used for storing data. By provisioning instead only the maximum capacity actually required for backup of changed data, it is not necessity to create, store and maintain metadata for unneeded capacity, and the corresponding burden and expense associated with excess metadata for the full selected reserved/restore capacity is avoided. By reporting the full reserved/restore capacity, the production host believes that it has available the full capacity and it operates normally. However, the excess reserved capacity is still available for use on demand as needed.

At 224, the backup appliance may monitor the growth in backup storage capacity requirements, and notify the management host subsystem 108 and the production subsystem using a management services module 170 (FIG. 1) when the growth exceeds a preset threshold. In response, the production subsystem 102 can increase the reserved/restore capacity and provision additional primary storage on demand, as necessary. Likewise, the capacity of both the primary and backup storage may be increased as needed by merely adding and provisioning additional storage devices.

From the foregoing, it will be appreciated that the invention affords an efficient, flexible and cost effective data protection system and method that is characterized by on-demand provisioning of restore devices, that avoids the necessity of creating, storing and maintaining unneeded metadata, that optimizes processing resources for storing primary and backup data, and that minimizes the burden and expense of providing unnecessary storage capacity. Furthermore, the system is easily expandable as needed. Additional storage capacity can be readily added as requirements increase.

While the foregoing has been with reference to particular embodiments of the invention, it will be appreciated that changes may be made to these embodiments without departing from the principles and spirit of the invention, the scope of which is set out in the appended claims.

The invention claimed is:

1. A method of backing up and restoring data in an integrated data protection system having primary storage for storing primary data, a backup storage device having a predetermined storage capacity for storing backup data from said primary storage, and a restore device for restoring lost data to primary storage from said backup device, comprising:

provideing a reserved storage capacity in said restore device corresponding to said predetermined storage capacity of said backup device;

storing periodically in said backup device, as backup data, primary data from said primary storage, said primary data comprising a plurality of primary data tracks having a predetermined track size, said storing comprising storing those primary data tracks having changed primary data as backup data tracks having said predetermined track size, and storing a corresponding changed tracks bitmap that maps said primary data tracks having changed primary data;

determining a maximum capacity necessary to restore lost primary data tracks from said backup device to said primary storage to return said primary storage to a predetermined restore point;

provisioning said restore device to have said maximum capacity; and configuring the restore device to report to a host that the restore device is configured to have the reserved storage capacity instead of said maximum capacity.

2. The method of claim 1 further comprising storing said backup data tracks on said restore device, and creating and storing metadata in a memory for only said backup data tracks stored on the restore device.

3. The method of claim 2 further comprising creating at preselected times differential point-in-time snapshots of said backup data on said backup device, and wherein said storing backup data tracks comprises copying backup track data from said backup device to said restore device using a selected snapshot.

4. The method of claim 3 further comprising aggregating changed tracks bitmaps and storing said aggregated changed tracks bitmaps with corresponding snapshots to create restore points.

5. The method of claim 4 further comprising restoring said lost data to said primary storage using a snapshot corresponding to a selected restore point prior to said data loss.

6. The method of claim 1, wherein said primary storage and said backup storage are integrated, and wherein said storing of primary data on said backup device comprises pushing said primary data tracks having changed primary data directly to said backup device.

7. The method of claim 1, wherein said storing said corresponding changed tracks bitmap comprises writing said bitmap to the backup device using a specially defined SCSI command.

8. The method of claim 1, wherein determining said maximum capacity comprises determining the number of tracks having changed data using said changed tracks bitmaps, and multiplying said number by said predetermined track size.

9. The method of claim 1 further comprising monitoring by the backup storage the growth in storage to said backup device, and increasing said backup device capacity upon said storage growth reaching a predetermined threshold.

10. A method of backing up and restoring data in an integrated data protection system having primary storage for storing production data from a plurality of production devices and having backup storage for storing backup data in a backup device, comprising:

reserving a selected restore capacity in a restore device that is sufficient to store backup data from said backup device, said backup data comprising a plurality of tracks of primary data from said primary storage, said tracks all having a predetermined track size;

pushing tracks of primary data having changed data and a changed tracks bitmap from said primary storage to said backup device for storage, said changed tracks bitmap mapping said changed tracks of primary data;

periodically aggregating bitmaps and storing the aggregated bitmaps with corresponding point-in-time snapshots of said backup data to create restore points;

determining the maximum capacity of the changed track backup data to be restored to restore said primary storage to a selected restore point;

provisioning said restore device with said maximum capacity of said changed track backup data; and reporting the provisioned capacity of the restore device to a production host as being said selected reserved capacity rather than said maximum capacity.

11. The method of claim 10 further comprising creating and storing metadata only for said provisioned maximum capacity.

12. The method of claim 10, wherein said reporting comprises setting the restore device geometry to report its capacity as being said reserved capacity in response to a query.

13. The method of claim 10 further comprising monitoring a growth in backup data, and provisioning additional backup capacity upon the growth exceeding a predetermined threshold relative to the provisioned capacity.

14. The method of claim 10 further comprising restoring said primary storage to said selected restore point by reading said changed track data from said restore device by a host that stores data in said primary storage.

15. Non-transitory computer readable media for storing executable instructions for controlling a processor for backing up and restoring data in a data protection system having primary storage for storing primary data, a backup storage device having a predetermined storage capacity for storing backup data from said primary storage, and a restore device for restoring lost data to primary storage from said backup device, comprising:

providing a reserved storage capacity in said restore device corresponding to said predetermined storage capacity of said backup device;

storing periodically in said backup device, as backup data, primary data from said primary storage, said primary data comprising a plurality of primary data tracks having a predetermined track size, said storing comprising storing those primary data tracks having changed primary data as backup data tracks having said predetermined track size, and storing a corresponding changed tracks bitmap that maps said primary data tracks having changed primary data;

determining a maximum capacity necessary to restore lost primary data tracks from said backup device to said primary storage to return said primary storage to a predetermined restore point;

provisioning said restore device to have said maximum capacity; and configuring the restore device to report to a host that the restore device is configured to have the reserved storage capacity instead of said maximum capacity.

16. The non-transitory computer readable media of claim 15 further comprising creating at preselected times differential point-in-time snapshots of said backup data on said backup device, and wherein said storing backup data tracks comprises copying backup track data from said backup device to said restore device using a selected snapshot.

17. The non-transitory computer readable media of claim 16 further comprising aggregating corresponding changed tracks bitmaps and storing said aggregated changed tracks bitmaps with corresponding snapshots to create restore points.

18. The non-transitory computer readable media of claim 15, wherein said primary storage and said backup storage are integrated, and wherein said storing of primary data on said backup device comprises pushing said primary data tracks having changed primary data directly to said backup device.

19. The non-transitory computer readable media of claim 15, wherein determining said maximum capacity comprises determining the number of tracks having changed data using said changed tracks bitmaps, and multiplying said number by said predetermined track size.

20. The non-transitory computer readable media of claim 15 further comprising monitoring by the backup storage the growth in capacity requirements of said backup device, and increasing said capacity upon reaching a predetermined threshold.

\* \* \* \* \*